(12) United States Patent
Niederberger

(10) Patent No.: US 8,044,702 B2
(45) Date of Patent: Oct. 25, 2011

(54) ARRANGEMENT AND METHOD FOR PROVIDING A TEMPERATURE-DEPENDENT SIGNAL

(75) Inventor: Mark Niederberger, Einsiedeln (CH)

(73) Assignee: austriamicrosystems AG, Unterpremstätten (AT)

( * ) Notice: Subject to any disclaimer, the term of this patent is extended or adjusted under 35 U.S.C. 154(b) by 231 days.

(21) Appl. No.: 11/992,556

(22) PCT Filed: Sep. 8, 2006

(86) PCT No.: PCT/EP2006/008791
§ 371 (c)(1),
(2), (4) Date: Jun. 24, 2009

(87) PCT Pub. No.: WO2007/036293
PCT Pub. Date: Apr. 5, 2007

(65) Prior Publication Data
US 2010/0013544 A1  Jan. 21, 2010

(30) Foreign Application Priority Data
Sep. 23, 2005  (DE) .......................... 10 2005 045 635

(51) Int. Cl.
*H01L 35/00* (2006.01)
(52) U.S. Cl. ...................................................... 327/513
(58) Field of Classification Search .................. 327/512, 327/513, 539
See application file for complete search history.

(56) References Cited

U.S. PATENT DOCUMENTS

| | | | |
|---|---|---|---|
| 6,008,685 A | 12/1999 | Kunst | |
| 6,078,208 A | 6/2000 | Nolan et al. | |
| 6,554,469 B1 | 4/2003 | Thomson et al. | |
| 6,674,185 B2* | 1/2004 | Mizuta | 307/651 |
| 6,726,361 B2* | 4/2004 | Bisping et al. | 374/178 |
| 6,736,540 B1 | 5/2004 | Sheehan et al. | |
| 6,869,216 B1* | 3/2005 | Holloway et al. | 374/170 |
| 6,890,097 B2 | 5/2005 | Tanaka | |

FOREIGN PATENT DOCUMENTS

EP  1 132 794  3/2001

OTHER PUBLICATIONS

Michiel A. P. Pertijs, et al. "A CMOS Smart Temperature Sensor with a 3σ Inaccuracy of ±0.5 ° C From —50 ° C to 120° C", IEEE Journal of Solid-State Circuits, vol. 40, No. 2, pp. 454-461, Feb. 2005.
Anton Bakker et al., "Micropower CMOS Temperature Sensor with Digital Output", IEEE Journal of Solid-State Circuits, vol. 31, No. 7, pp. 933-937, Jul. 1996.
Anton Bakker, "CMOS Smart Temperature Sensors—An Overview", IEEE Proceedings, vol. 2, pp. 1423-1427, Jun. 2002.
Mike Tuthill, "A Switched-Current, Switched-Capacitor Temperature Sensor in 0.6μm CMOS", IEEE Journal of Solid-State Circuits, vol. 33, No. 7, pp. 1117-1122, Jul. 1998.

* cited by examiner

*Primary Examiner* — Jeffrey Zweizig
(74) *Attorney, Agent, or Firm* — Cozen O'Connor

(57) ABSTRACT

An arrangement and a method for providing a temperature-dependent signal. Several current sources (1, 2) are provided, which are switchably connected to one or more diodes (8). The conducting-state voltage of the diode is compared with a reference signal ($V_r$) in a comparator (10). A control circuit (12) controls the current sources (1, 2) so that for calibrating in each calibration step, only one of the current sources is activated and, in another calibration step, all of the current sources (1, 2) are activated. Therefore, error terms can be calculated, which allow a very exact provision of a temperature-dependent signal with respect to the matching of the current sources to each other.

11 Claims, 2 Drawing Sheets

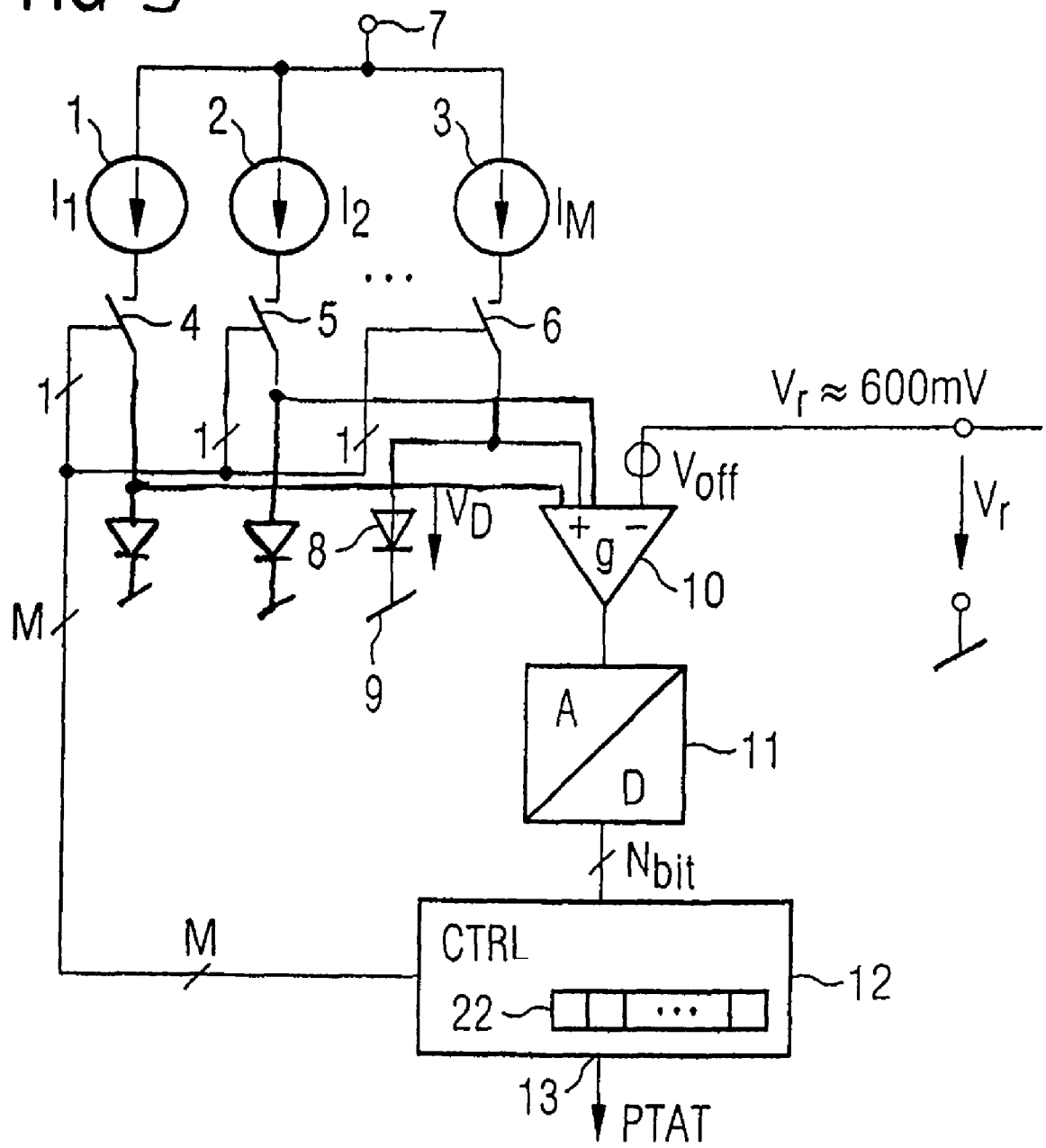

ARRANGEMENT AND METHOD FOR PROVIDING A TEMPERATURE-DEPENDENT SIGNAL

RELATED APPLICATIONS

Figure 1:
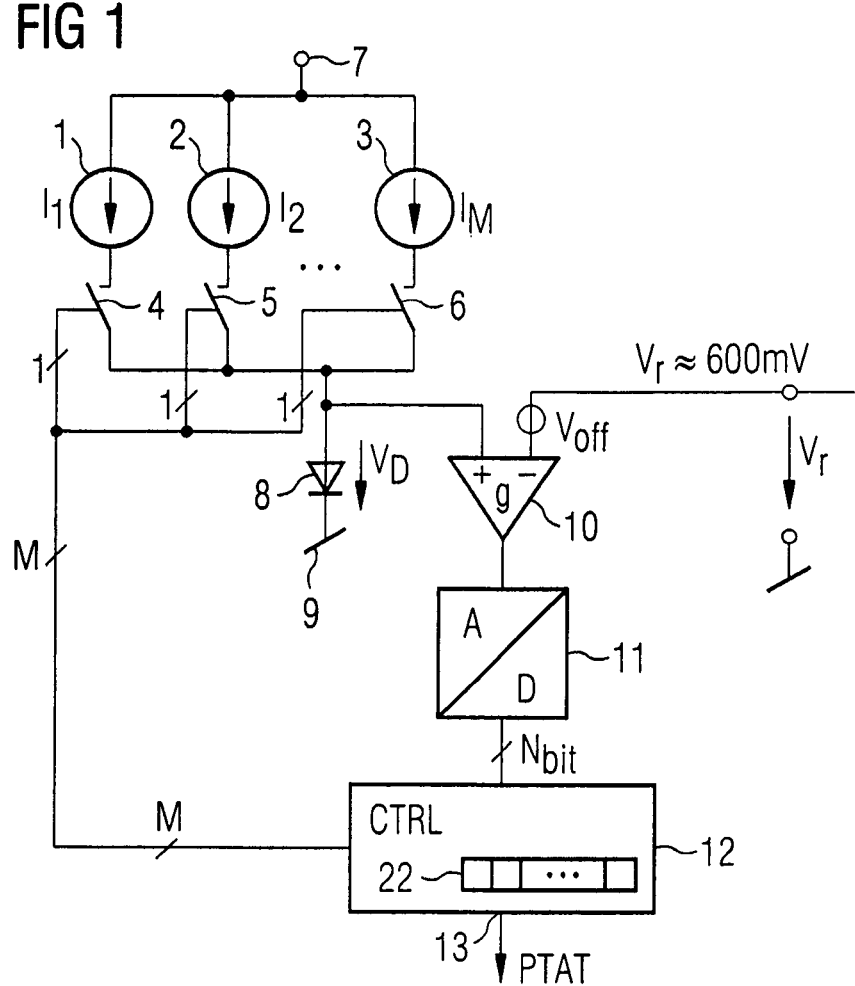

This is a U.S. national stage of application No. PCT/EP2006/008791, filed on Sep. 8, 2006.

This application claims the priority of German patent application 10 2005 045 635.9 filed Sep. 23, 2005.

FIELD OF THE INVENTION

The present invention relates to an arrangement for providing a temperature-dependent signal and also to a method for providing a temperature-dependent signal.

BACKGROUND OF THE INVENTION

The provision of a signal that is proportional to the absolute temperature is desirable for numerous applications. Such signals are also designated as PTAT, proportional-to-absolute-temperature. For this purpose, a switching circuit that performs a so-called on-chip temperature measurement is suitable.

For the purpose of such an on-chip temperature measurement, frequently a voltage difference between two bipolar diodes, which are charged with different current densities, is evaluated. In the present document, bipolar transistors connected as diodes are understood as bipolar diodes. The difference in the voltages across the two diodes corresponds directly to a temperature-proportional voltage $V_{PTAT}$ according to the rule:

$$V_{Ptat} = V_{d2} - V_{d1} = V_T * l_n \frac{I_2}{I_1}$$

Here, $V_{d1}$ designates the voltage across the first diode wired in the conducting direction, $V_{d2}$ designates the voltage across the second diode wired in the conducting direction, the quotient from $I_2/I_1$ designates the ratio of the current densities, with which the first or second diodes are charged, and $V_T$ designates the temperature voltage of a diode.

To provide such a circuit, it is typical, for example, to provide two current sources scaled relative to each other, which are connected between a power-supply voltage terminal and a reference voltage terminal, each in a current path with a diode biased in the forward direction. Each input of a differential amplifier is connected to an anode of a diode. At the output, a signal is provided that corresponds to the value of the voltage $V_{Ptat}$ multiplied by the amplification factor g of the differential amplifier.

If the temperature-proportional signal is to be provided as a digital signal, then an analog/digital converter can be connected to the differential amplifier.

Such an arrangement, however, suffers from so-called mismatches, both between the diodes and the current sources, which unavoidably appear in the mass production of integrated circuits. In addition, the offset of the amplifier also leads to inaccuracy in the measurement. Methods for compensating such non-ideal properties include, for example, so-called component rotation or chopping.

For example, the document by Anton Bakker: "CMOS Smart Temperature Sensors—An Overview", IEEE Proceedings, Vol. 2, June 2002, gives an overview of temperature sensors, which can be produced in integrated CMOS processing technology. For example, in FIG. 8 of this document, it is proposed to reach a high accuracy of an integrated PTAT generator with a chopper technique, that is, to periodically chop the signals.

The article by A. Bakker and J. H. Huijsing: "Micropower CMOS Temperature Sensor With Digital Output", IEEE Journal of Solid-State Circuits, Vol. 3.1, No. 7, July 1996, similarly shows a chopped PTAT circuit in FIG. 3, in which a $\Sigma\Delta$ converter is also provided for signal evaluation.

The document "A Switched-Current, Switched-Capacitor Temperature Sensor in 0.6 µm CMOS" by Mike Tuthill, Journal of Solid-State Circuits, Vol. 3.3, No. 7, Jul. 1998, shows an integrated temperature sensor, which is connected in a so-called Switched Current, Switched Capacitor technique.

The article by A. Bakker and J. H. Huijsing, et al.: "A CMOS Smart Temperature Sensor With A 3σ Inaccuracy of +/−0.5° C. from −50° C. to 120° C., IEEE Journal of Solid-State Circuits", Vol. 40, No. 2, February 2005, shows a temperature sensor with a $\Sigma\Delta$ modulator and chopping principle.

These circuits have in common the property that the error to be compensated is not completely erased. Either a large expenditure in analog circuitry technology is necessary or additional, undesired properties, such as charge injection, circuitry noise, or the like are introduced.

The document U.S. Pat. No. 6,554,469 shows a temperature sensor with four currents and one transistor. Here it is provided to charge the transistor with each of the four currents and to measure the resulting base-emitter voltage. However, an error relative to the linear amplification remains caused by a mismatch of the current sources.

The document EP 1 132 794 A1 describes a method and an arrangement for obtaining a temperature-independent voltage reference. Here, the amplification factor of an analog/digital converter is calculated from a plurality of digital measurement values.

SUMMARY OF THE INVENTION

One object of the present invention is to provide a circuit arrangement and a method for providing a temperature-dependent signal in which amplification errors of the temperature measurement are significantly reduced. The circuit arrangement should have lower sensitivity in terms of mismatches in the components that are used.

This and other objects are attained in accordance with one aspect of the present invention directed to an arrangement for providing a temperature-dependent signal, comprising:
  a first current source, which is switchably connected to a diode,
  a second current source, which is switchably connected to the diode or a different diode,
  a comparator, which is coupled to an input with the first and the second current sources and to which a reference signal can be fed at a second input,
  a control circuit with an input that is coupled with an output of the comparator, and with outputs for switchably connecting to the current sources, such that for calibrating in a first calibration state, only the first current source is activated, in a second calibration state, only the second current source is activated, and in a third calibration state, all of the current sources are activated, and with an output of the control circuit for providing the temperature-dependent signal in a normal operating state.

Another aspect of the invention is directed to a method for providing a temperature-dependent signal with the steps of:
generating a first current with a first current source,
generating a second current with a second current source,
generating a third current with the first and the second current source,
comparing a voltage across a diode carrying a current with a reference signal,
calculating error terms as a function of the three currents,
providing a temperature-dependent signal compensated with respect to the error terms.

Several current sources can be provided so that they are switchably connected to each current source. The current paths with the current sources either each have a diode or there is a common diode. In each case, a comparison is performed of a voltage across a diode carrying a current with the reference signal. For calibration, initially each current source is activated individually one after the other and all of the current sources are activated simultaneously in another step or calibration state. From these measurements for calibration, error terms can be calculated, as explained in detail below. The temperature-dependent signal is provided so that it is compensated with respect to these error terms.

Amplification errors of the temperature measurement are reduced, in that mismatches between current sources and/or diodes, and also amplifier offset are eliminated through simple arithmetic operations.

The disclosed circuit sets lower requirements on the analog circuit properties, for example, matching tolerance, of equally dimensioned components.

The circuit provides current sources that can be added or subtracted independently of each other to the one or more diodes. Based on a logarithmic ratio between the forward voltage of the diode and the forward current of the diode, a mismatch with respect to each unit current source can be easily measured and later compensated. This is performed preferably by simple addition or subtraction of an associated error term. The proposed architecture further simplifies and improves the test possibilities of the circuit, because the relative error contribution of each current source can be measured individually and independently of each other. Therefore, a highly precise current measurement is not required.

Preferably, an analog/digital converter is connected between the comparator and the control circuit. In this way, the mentioned arithmetic operations can be performed digitally, preferably by the simple digital addition or subtraction of error terms.

The control circuit preferably includes means for calculating and compensating errors as a function of the comparison results.

The control circuit preferably further includes error memories, wherein at least one error memory is provided for each current source assigned to this circuit.

For the further reduction of mismatches, all of the current sources are switchably connected to the same diode. Thus, the entire circuit can be realized with only a single diode.

Preferably, the current sources are each designed equally with respect to the current intensity in the connected state. Such current sources are also designated as unit current sources.

In one embodiment, all of the current sources are integrated in integrated semiconductor circuit technology and have equal geometric dimensions.

For switchably connecting the current sources, in one embodiment, each switch is connected in series to an associated current source.

Alternatively or additionally, the current sources themselves can be connected or disconnected. This can be realized, for example, such that each bias signal provided for the current source for its operation can be connected and disconnected.

Preferably, the bias supply for the current sources comprises a current mirror. Here, the common base or gate signal of the current mirror can be switched. For this purpose, for example, a switch can be connected between the gate connections or base connections of the transistors forming the respective current mirror.

Current mirrors with a common input transistor, which forms a current mirror with a corresponding output transistor assigned to each current source, are further preferred for controlling the current sources with a bias signal. Therefore, the rectifying properties of the circuit are further improved.

The reference signal fed to the comparator is tailored to the conducting-state voltage that is also designated as the forward voltage of the associated diode or diodes. Preferably the reference signal is provided in the form of a reference voltage of approximately 600 mV.

The arrangement is preferably constructed completely as integrated circuit technology. The temperature-dependent signal provided at the output of the control circuit is preferably a temperature-proportional signal: PTAT, proportional to absolute temperature.

Figure 2:
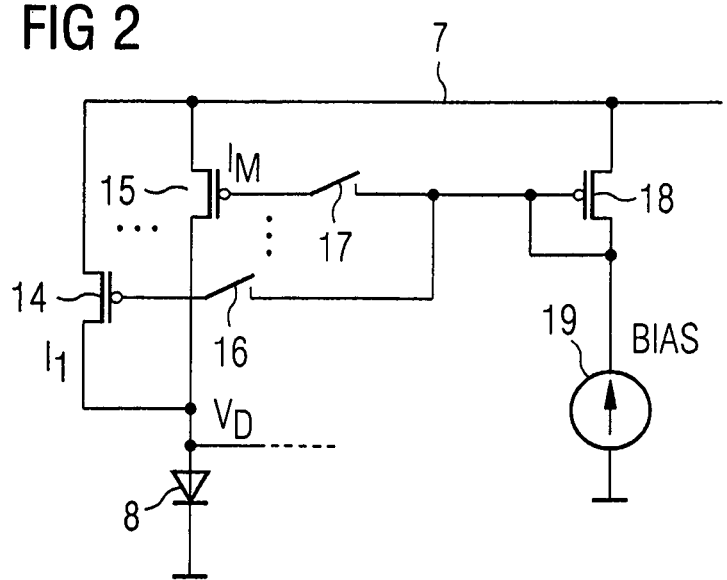

FIG. 1 depicts a schematic circuit diagram according to an embodiment of the invention, and FIG. 2 shows a schematic circuit diagram according to an embodiment of the invention for controlling the current sources with switchable current mirrors.

FIG. 3, another embodiment which utilizes more than one diode.

DETAILED DESCRIPTION OF THE DRAWINGS

FIG. 1 shows an arrangement for providing a temperature-dependent signal PTAT. A first current source 1 is arranged in common with a first switch 4 in a first current path. A second current source 2 with a second switch 5 is arranged in a second current path. An M-th current source 3 is arranged together with another switch 6 in a third current path. The three current paths each including a current source 1, 2, 3 and a switch 4, 5, 6 are connected to each other in a parallel circuit and connected between a power-supply voltage terminal 7 and the anode terminal of a diode 8. The cathode terminal of the diode 8 is connected to a reference potential terminal 9.

The anode terminal of the diode 8 is further connected to a non-inverting input of a comparator 10, having an inverting input that can be fed a reference signal $V_r$. This signal can have an offset voltage $V_{off}$. The comparator 10 has an amplification factor g. The output of the comparator 10 is connected via an analog/digital converter 11 to a control circuit 12 via a line with an N-bit word width. The control circuit 12 includes error memories 22. The control circuit 12 has a digital output with an M-bit width corresponding to the number of switches 4, 5, 6 assigned to the current sources 1, 2, 3. This control output of the control circuit 12 is connected to control inputs of the switches 4, 5, 6 for their control. This is used to switchably connect the current sources 1, 2, 3 individually and independently of each other. Another output 13 is used for providing the temperature-dependent signal PTAT.

The circuit of FIG. 1 is constructed using integrated circuit technology for on-chip temperature measurement. Only one individual diode 8 and M current sources 1, 2, 3, which can be connected to the diode, are provided. The amplifier 10 is constructed as a differential amplifier and amplifies the conducting-state voltage $V_D$ of the diode relative to the reference voltage $V_r$. The reference voltage $V_r$ has approximately the same value as the expected conducting-stage voltage of the diode of, for example, ca. 600 mV. The analog/digital converter 11 converts the output value of the differential amplifier 10 to an N-bit digital value. In a first calibration process, each of the current sources 1, 2, 3 is activated individually, which means that the remaining current sources are disconnected. In another calibration step, all of the current sources are connected simultaneously, as explained in more detail below.

In a normal operating mode, which can also be designated as the measurement operating mode, for providing the temperature-dependent signal, the conducting-state voltage $V_D$ of the diode 8 is measured at two different current values of the diode currents, which are designated as $I_0$ and $I_1$. As already explained and, in particular, for reducing the requirements on the A/D converter 11, the diode voltage is not measured absolutely, but instead relatively as a reference voltage with respect to a reference potential $V_r$. This voltage difference is amplified by the differential amplifier 10 with an amplification g and converted by the A/D converter 11 into a digital value. Here, the diode voltage is measured according to an embodiment of the invention at two different currents and each time with respect to the reference signal $V_r$. Finally, the difference of these determined values is calculated with digital signal processing in the control circuit 12 by simple subtraction of the measured digital values.

The calculation of the voltage values $V_1$ and $V_0$ is here performed according to the calculation rules listed below.

$$V_1 = g(V_{d1} + V_{off} - V_r)$$

$$V_0 = g(V_{d0} + V_{off} - V_r)$$

Here, g designates the amplification of the differential amplifier 10, $V_{off}$ a possible offset of the differential amplifier 10, $V_r$ the reference voltage, $V_{d1}$ the diode voltage at the current $I_1$, and $V_{d0}$ the diode voltage for a current $I_0$, at which all of the M current sources are connected according to the sum formula $$I_0 = \sum_M I_x$$

By forming the difference of the two voltages $V_1$, $V_0$, this gives the PTAT signal in the form of a voltage $V_{PTAT}$ according to the following rule:

$$V_{PTAT} = V_0 - V_1 = g(V_{d0} - V_{d1}) = g \cdot \underbrace{V_T}_{\frac{k \ast T}{q}} \cdot l_n \frac{I_0}{I_1}$$

One recognizes that the possible offset voltage of the differential amplifier and also the value of the reference signal are completely erased. In this way, because the same diode is used for both measurements $V_1$ and $V_0$, no errors arise.

With respect to possible variations or mismatches in the values of the current sources, the following consideration applies. The current source for providing the current $I_0$ is formed by all M current sources, which are matched to each other and which appear as standard current sources and which consequently, in the ideal state, each output an identical current $I_1$. Each current source, however, can have an error $\epsilon_x$ relative to the first current source 1, which provides the current $I_1$. Therefore, the current $I_0$ can be represented as $$I_0 = I_1 \sum_{x=1}^{M} (1 + \varepsilon_x)$$

From this follows, for the temperature-proportional signal $V_{PTAT}$:

$$V_{PTAT} = g \cdot V_T \cdot l_n \frac{I_1 \sum_{x=1}^{M}(1+\varepsilon_x)}{I_1}$$

$$V_{PTAT} = g \cdot V_T \cdot l_n \left[ \sum^{M}(1+\varepsilon_x) \right]$$

$$V_{PTAT} = g \cdot V_T \cdot l_n \left[ M \left( 1 + \frac{\sum^{M} \varepsilon_x}{M} \right) \right]$$

$$V_{PTAT} = g \cdot V_T \cdot \left[ l_n M + l_n \left( 1 + \frac{\sum^{M} \varepsilon_x}{M} \right) \right]$$

Here, $$\frac{\sum^{M} \varepsilon_x}{M}$$

is the average mismatch of all of the individual current sources 1, 2, 3.

Because the current sources are constructed as standard current sources relative to each other, the relative error of a single current source can be considered as small, just like the average mismatch of all of the current sources according to the above rules. From this it follows that, to a first approximation: $\ln(1+x) \approx x$. This applies with very good approximation if x is small relative to 1. From this it follows, for the result of the PTAT voltage:

$$V_{PTAT} = g \cdot V_T \cdot \left[ \underbrace{l_n \cdot M}_{ideal} + \underbrace{\frac{\sum^{M} \varepsilon_x}{M}}_{Error\ term} \right]$$

The above formula includes an ideal term and an error term. The error term corresponds to the average of all individual errors. Therefore, this error term can be determined very easily by first detecting the diode voltage for each individually activated current source and then determining the error with reference to the diode voltage $V_{d1}$ for the first voltage source 1 with the current $I_1$.

The error term for any individual current source $V_y$ with $y=2\ldots M$ is given according to the following formula:

$$V_y = g(V_{DY} + V_{off} - V_r)$$

$$V_y - V_1 = g(V_{DY} - V_{d1}) = g \cdot V_T \cdot \ln \frac{I_y}{I_1}$$

with $I_y = I_1(1+\epsilon_y)$ it follows:

$$V_y - V_1 = g \cdot V_T \cdot \ln \frac{I_1(1+\varepsilon_y)}{I_1}$$

$$V_y - V_1 = g \cdot V_T \cdot \ln(1+\varepsilon_y)$$

With the known approximation rule for the specified natural logarithm, a good approximation for the error term of an individual current source results:

$$V_y - V_1 = g \cdot V_T \epsilon_y$$

The error term can be calculated especially easily in digital circuit technology when M is selected so that it corresponds to a value $2^k$ for an integer k.

As a result, it can be determined that the mismatches between the individual current sources are similarly erased according to the present invention.

An embodiment of the present invention requires M+1 measurements for M current sources. Here, M measurements are performed for the measurement of the conducting-state voltage relative to each individual current source, as well as a measurement for determining the conducting-state voltage for charging with the sum current from all current sources. As presented above, all errors and offset errors caused by mismatches are completely erased.

A voltage reference required for the analog/digital converter 11 does not need an especially low temperature drift. A temperature drift of, for example, 50 ppm/K, which is not too difficult to achieve, leads to a temperature error of only 0.5° C. over a temperature range of 100° C. A smaller temperature drift of the reference of the A/D converter 11 improves the measurement accuracy even further.

FIG. 2 shows an embodiment for another operating mode for switchably connecting the current sources.

The circuit of FIG. 2 generally corresponds to that of FIG. 1 in the components that are used and their advantageous wiring. However, for simplifying the illustration, a few functional blocks are not shown in FIG. 2, for example, the comparator 10, the converter 11, and the control circuit 12. In contrast to FIG. 1, FIG. 2 does not provide a series circuit of a current source with a switch in a common current branch, but instead the current sources 14, 15, of which, in FIG. 2, as an example and without limiting generality, only two are shown, which are directly connected between the power-supply voltage terminal 7 and the anode terminal of the diode 8. The switches 16, 17 for switchably connecting the current sources 14, 15 are instead connected in FIG. 2 to the control terminal of the current sources, that is, in the present case, to the gate terminal of the current sources 14, 15 constructed as PMOS field-effect transistors. Other terminals of the switches 16, 17 are wired to each other and to a gate terminal of an input transistor 18 of the current mirrors. The input transistor 18 of the current mirrors is wired as a diode and connected to a bias reference current source 19. Thus, both the transistor 14 and also the transistor 15 form, together with the transistor 18, respective current mirrors, which can be switchably connected, however, by means of the switches 16, 17 independently of each other.

Obviously, in FIG. 2, other current sources can also be provided with other switches.

The rectifying properties of the current sources are even further improved by the common bias supply.

Obviously, the circuit of FIG. 2 can also be constructed with n-channel transistors, with bipolar transistors, in BiCMOS circuit technology, or a different circuit technology.

FIG. 3 is another embodiment. It is the same as the embodiment of FIG. 1, except that instead of having only one diode 8 for all of the current sources, the current path for each current source has its own diode 8. Thus, three diodes 8 are shown corresponding to the three current sources, respectively.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

The invention claimed is:

1. An arrangement for providing a temperature-dependent signal, comprising:
    a first current source, which is switchably connected to a diode;
    a second current source, which is switchably connected to the diode;
    a comparator, which is coupled at one input to the first and to the second current source and which receives a reference signal at a second input; and
    a control circuit with an input, which is coupled to an output of the comparator, and with outputs for connecting and disconnecting the current sources, such that for calibration in a first calibration state only the first current source is activated, in a second calibration state only the second current source is activated, and in a third calibration state all of the current sources are activated, and with an output of the control circuit for providing the temperature-dependent signal in a normal operating mode.

2. The arrangement according to claim 1, wherein the control circuit includes means for calculating and compensating errors as a function of the comparison results.

3. The arrangement according to claim 1, wherein the control circuit includes error memories, wherein one of the error memories is assigned to each of the current sources.

4. The arrangement according to claim 1, wherein an analog/digital converter is connected between the comparator and the control circuit.

5. The arrangement according to claim 1, wherein the current sources are each designed equally with respect to the current intensity in the connected state.

6. The arrangement according to claim 1, wherein, for switchably connecting the current sources, a switch is provided arranged with the associated current source in a common current path.

7. The arrangement according to claim 1, wherein the current sources are controlled by a common bias source.

8. The arrangement according to claim 7, wherein for controlling the current sources with the common bias source, a respective current mirror is provided, wherein a common input transistor of the current mirrors is comprised by the bias source.

9. An arrangement for providing a temperature-dependent signal, comprising
    a first current source connected to a diode;
    a second current source connected to the diode;
    a comparator, which is coupled at one input to the first and to the second current source and which receives a reference signal at a second input;
    a control circuit with an input, which is coupled to an output of the comparator, and with outputs for connecting and disconnecting the current sources, such that for calibration in a first calibration state only the first current source is activated, in a second calibration state only the second current source is activated, and in a third calibration state all of the current sources are activated, and with an output of the control circuit for providing the temperature-dependent signal in a normal operating mode; and
    a common bias source configured to control the current sources, a respective current mirror being provided to control the current sources with the common bias source which comprises a common input transistor of each respective current mirror;

wherein one of a base signal and gate signal in an associated current mirror is switchable to connect and disconnect the current sources.

10. A method for providing a temperature-dependent signal comprising the steps of:

generating a first current with a first current source;

generating a second current with a second current source;

generating a third current with the first and the second current sources;

comparing a voltage across a diode carrying the first, the second, or the third current with a reference signal;

calculating error terms as a function of the three currents; and providing a temperature-dependent signal compensated with respect to the error terms.

11. The method according to claim 10, further comprising digitizing the comparison signal output in the comparison.

* * * * *